(12) United States Patent
Van Loenen et al.

(10) Patent No.: US 8,348,538 B2
(45) Date of Patent: Jan. 8, 2013

(54) EXPRESSIVE PEN

(75) Inventors: Evert Jan Van Loenen, Eindhoven (NL); Geert Langereis, Eindhoven (NL); Ralph Kurt, Eindhoven (NL); Steffen Reymann, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 874 days.

(21) Appl. No.: 12/295,757

(22) PCT Filed: Mar. 28, 2007

(86) PCT No.: PCT/IB2007/051093
§ 371 (c)(1),
(2), (4) Date: Oct. 2, 2008

(87) PCT Pub. No.: WO2007/113743
PCT Pub. Date: Oct. 11, 2007

(65) Prior Publication Data
US 2009/0264713 A1    Oct. 22, 2009

(30) Foreign Application Priority Data
Apr. 4, 2006 (EP) .................................. 06112202

(51) Int. Cl.
*B43K 29/00* (2006.01)
(52) U.S. Cl. .............. 401/195; 346/140.1; 347/109; 345/179

(58) Field of Classification Search .......... 401/195, 401/52; 346/140.1, 140.01; 347/109; 345/179
See application file for complete search history.

(56) References Cited

U.S. PATENT DOCUMENTS

| | | | |
|---|---|---|---|
| 5,447,167 A | | 9/1995 | Fleischaker |
| 6,092,951 A | * | 7/2000 | Greene et al. ................ 401/99 |
| 6,375,622 B1 | | 4/2002 | Kao et al. |
| 6,390,711 B1 | * | 5/2002 | Brunetti .................... 401/224 |
| 6,454,482 B1 | * | 9/2002 | Silverbrook et al. ......... 401/195 |
| 2003/0149379 A1 | | 8/2003 | Krullaards |
| 2005/0027525 A1 | | 2/2005 | Funakura |
| 2005/0122319 A1 | | 6/2005 | Sakurai et al. |

FOREIGN PATENT DOCUMENTS
EP    1319522 A2    6/2003
GB    2413425 A    10/2005

OTHER PUBLICATIONS

G. Waibel, et al; Electronic Fountain Pen—A Highly Integrated Stand-Alone Microdosage System, 2002 IEEE, HSG-IMIT, Germany.

* cited by examiner

*Primary Examiner* — David Walczak

(57) ABSTRACT

A pen which is able to modulate the trace of the pen in response to a sensory signal of the user, such as for example skin conductance or respiration. The sensory signals represent the mood of the user. By changing the trace of the pen, a change in mood of the user can be expressed.

17 Claims, 4 Drawing Sheets

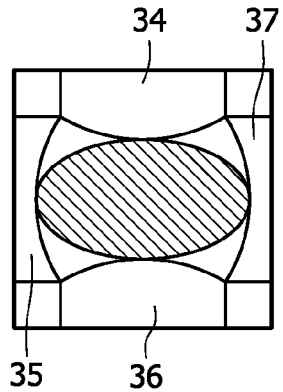
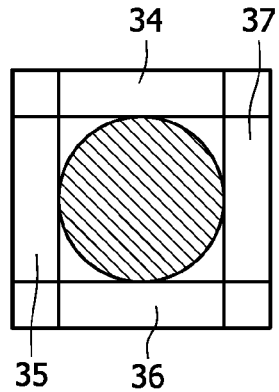
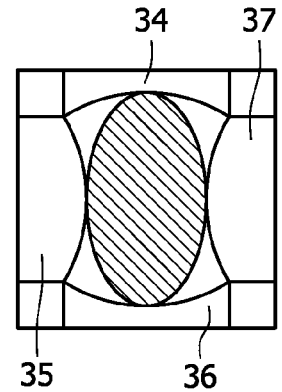
FIG. 3a    FIG. 3b    FIG. 3c
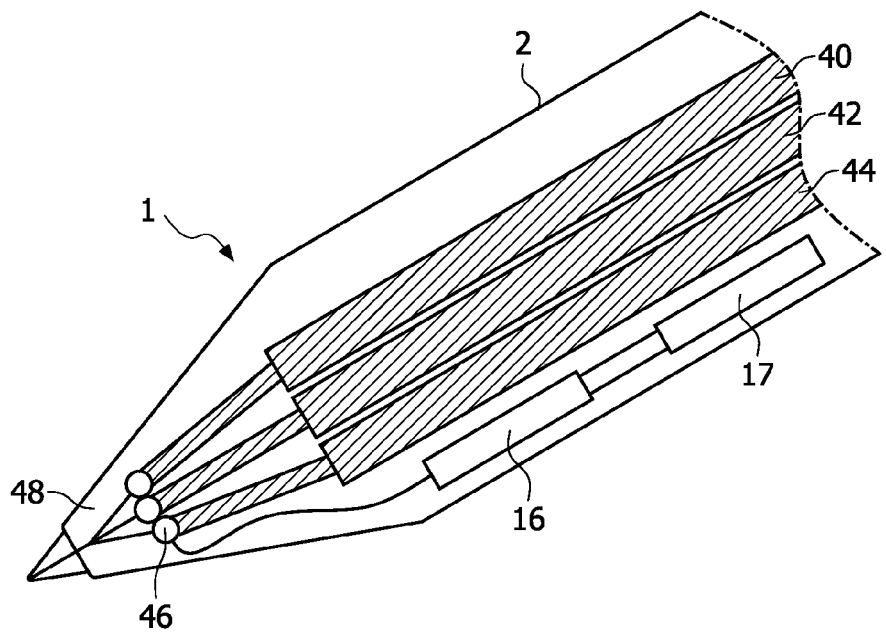
FIG. 4

*I am not sure but determined to*

FIG. 7

EXPRESSIVE PEN

FIELD OF THE INVENTION

This invention relates to a writing instrument, such as a pen or stylus, which is arranged to detect and express the mood of a user.

BACKGROUND OF THE INVENTION

Self-expression is a very important human need, though often overlooked because it typically is a latent need, one that is present but rarely referred to explicitly. Examples are fashion, acting or performing, where the emphasis clearly is on showing something about oneself to others, but also new forms of self expression are emerging, like blinging (abundant decoration of mobile phones) and blogging (expressing one's views or daily experiences to the entire world on the internet).

One of the earliest forms of self expression is writing: autobiographies, letters, diaries. In written (or typed) text, experiences can be recorded by careful selection of words and sentences. What cannot be easily recorded however, is the mood of the writer at the moment of writing. Publication U.S. Pat. No. 6,375,622 B1 describes a writing brush with one or more biological sensors embedded in or attached to the shaft of the writing brush. The biological sensors record the biological activities of the user that are associated with the user's sensory, perceptual, emotional, cognitive and physiological conditions during writing or drawing. The sensory signals from the detectors provide ongoing information of the user's graphonomic act and thus enable the user to control and regulate his or her bodily conditions throughout the writing process by influencing the changes of the sensory signals. The writing pen is used for Chinese brush writing which is known as an art capable of achieving emotional stabilization and mental relaxation. However, the user cannot express his or her mood other than in the text written. Yet such a need clearly exists, as evidenced by the use of for example smileys in e-mail, sometimes crucial to convey the correct message (to indicate one is serious, or joking etc.). The latter method is rather cumbersome because the writer has to include explicitly such mood indicators in the text.

SUMMARY OF THE INVENTION

It is an object of the present invention to provide a writing instrument capable of automatically and continuously expressing the mood of the writer in the text that is written.

The object is achieved by a writing instrument comprising:
  a writing shaft;
  a sensing device for recording at least one sensory signal of the user, the sensory signal being selected from the group consisting of heart rate, EEG, Surface EMG, GSR/skin conductance, respiration, blood pressure, skin temperature and finger pressure;
  an actuator arranged to modulate a trace of the writing instrument depending on the at least one recorded sensory signal.

By modifying the trace depending on the recorded signal, the trace is actually showing mood changes of the user.

The actuator may be arranged to determine the width of the trace. In another embodiment, the actuator is arranged to adjust the colour of the trace. Alternatively, the actuator may be arranged to adjust the continuity of the trace. The sensing device may be embedded on the writing shaft itself. For example, the sensing device may comprise a pressure transducer embedded on the writing shaft to monitor the force exerted thereon by the user during the writing activity.

The writing instrument may comprise one or more ink reservoirs each comprising a specific colour. Different colours can indicate all kinds of different moods of the user.

The actuator may be arranged to eject ink out of one outlet corresponding to a specific ink reservoir. In an embodiment, the actuator comprises a plurality of micro valves. Or the actuator may comprise an inkjet element for ejecting ink out of the writing instrument.

In a specific embodiment, the writing instrument comprises a flexible nozzle and wherein said actuator is arranged to deform the outlet of the nozzle.

The invention also relates to a computer device comprising:
  a receiver for receiving at least one sensory signal of a user of a stylus, the sensory signal being selected from the group consisting of heart rate, EEG, Surface EMG, GSR/skin conductance, respiration, blood pressure, skin temperature and finger pressure;
  a processor arranged to modulate a trace of the stylus depending on the at least one sensory signal.

Such a computer device can receive the sensory signals form a stylus which is arranged to record and transmit the signals to the computer.

Finally, the invention relates to a method of writing comprising:
  recording at least one sensory signal of the user by means of a writing instrument comprising a sensing device, said sensory signal being selected from the group consisting of heart rate, EEG, Surface EMG, GSR/skin conductance, respiration, blood pressure, skin temperature and finger pressure;
  modulating a trace of the writing instrument depending on the at least one recorded sensory signal.

These and other aspects of the invention will be apparent from and elucidated with reference to the embodiments described hereinafter.

BRIEF DESCRIPTION OF THE DRAWINGS

Hereinafter, the invention will be explained with reference to some drawings which are intended to illustrate the invention and not to limit its scope, and wherein:

FIGS. 3A-3C schematically show possible configurations of a cross section of an outlet of the pen tip of FIG. 2;

FIG. 4 schematically shows a possible ink control solution according to an embodiment;

FIG. 7 shows an example of a trace produced by a person going through emotions of insecurity/self confidence.

DESCRIPTION OF PREFERRED EMBODIMENTS

Figure 1:
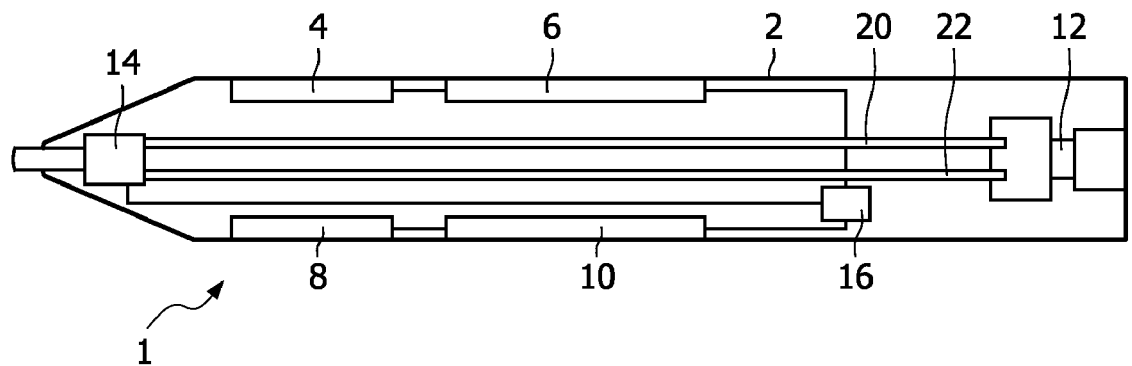
FIG. 1 schematically shows a pen according to an embodiment.

FIG. 1 shows an embodiment of the invention in which a pen 1 comprises a shaft 2 with sensors 4, 6, 8, 10 embedded in and/or on the shaft 2 of the writing instrument 1. The sensors 4, 6, 8, 10 are arranged to record a sensory signal of a user that is relevant for mood detection. In the embodiment of FIG. 1, sensor 4 is a pressure sensor arranged to record a pressure of the fingers on the shaft 2. This pressure is a relevant indicator (e.g. for stress), and is detected with simple pressure sensors, such as small pressure sensitive foils, integrated with/under conductance pads. Sensor 6 is a heart-beat sensor arranged to measure the heart rate of the user. As is known to the skilled person, the heart beat can be detected from fingers, by clamping e.g. optical sensors on a fingertip This technique is referred to as plethysmography and is for example used in fitness equipment. For the purpose of this invention, the plethysmography principle is inverted: the fingers already clamp around the pen, so the heartbeat is detectable in the same way. As is commonly known, heartbeat (variations) are a direct indicator of anxiety, arousal.

The embodiment of FIG. 1 also comprises skin conductance sensors 8, 10, arranged to record a conductance of the skin of the user. Skin conductance is known from literature in the field of emotional computing to be a direct indicator of anxiety/relaxation. This can be easily measured by measuring (variations in) resistance (conductance) between two or more contact-pads 8, 10 on the insulating pen shaft 2. The contact pads 8, 10 may be positioned as indicated in FIG. 1 or other configurations are possible, such as one pad positioned at a spot where the fingertips touch the pen (near the tip) and one at the other of the pen, where it rests on the hand.

FIG. 1 shows an example wherein the pen 1 comprises a plurality of ink reservoirs 20, 22. Also a pressure sensor 12 may be arranged inside the pen 1, wherein the pressure sensor 12 is arranged to sense a pressure on the ink reservoirs 20, 22 which is actually the pressure applied by the user on the paper.

Other mood related parameters that could be measured by sensors on the pen include muscle action potentials (using surface EMG contacts) and skin temperature (using e.g. thermocouples). It is appreciated that also other sensory signals can be recorded including EEG, ECG, respiration and blood pressure. These however, typically will require the use of external sensors: on/near the brain for EEG, on/near the mouth or lungs for respiration, on/near the heart for ECG.

According to an embodiment of the invention, the pen 1 comprises an actuator 14 arranged to modulate a trace of the pen 1. The pen 1 of FIG. 1 comprises an actuator 14 in the pen tip. In addition to the sensors and actuators, the pen 1 may include some electronics to process the sensor inputs, such as a processor 16 and a battery (not shown).

Figure 2:
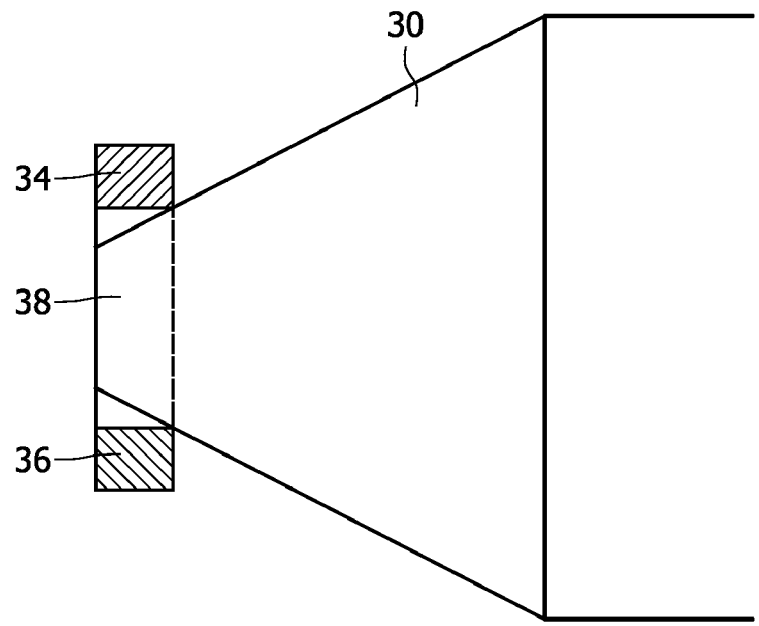
FIG. 2 schematically shows a pen tip according to an embodiment.

FIG. 2 shows a cross section of a pen tip according to an embodiment of the invention. Actuator elements 34, 36 are arranged at the pen tip for adjusting the shape of an outlet 38 of a flexible nozzle 30 and thereby changing a width of the written trace. A broad line (i.e. trace) could e.g. represent tension, a narrow line relaxation. This is most easily imagined for gel- or felt pens. Here the nozzle 30 could be made of an elastic material, such as rubber. In this example, the pressure of the ink will cause the nozzle outlet 38 to be circular by default. However, by applying pressure (mechanically or thermally) on opposing sides of the nozzle 30, its outlet 38 will deform, thus changing the line width. In FIGS. 3A, 3B, 3C three examples are shown of configurations of actuator elements 34, 35, 36, 37 arranged around the nozzle 30.

In another embodiment, the actuator 14 can vary the colour of the line written. E.g. blue for calm state, red for passionate, etc. FIG. 4 shows an example of this embodiment, wherein the pen 1 comprises a plurality of ink reservoirs 40, 42, 44. For fast switching of colours, the actuator 14 may comprise micro-valves 46 positioned close to the contact point between pen 1 and paper. Transport of the ink from micro-valves 46 to the paper (not shown) is accomplished by normal capillary methods, see capillaries 48. In this embodiment, the actuator 14 may for example consist of a bundle of very narrow gel channels 48, connected via micro-valves in the tip of the pen 1, or extending individually to the end of the tip. Using appropriate base colors (e.g. Cyan, Magenta, Yellow), any color can be created by controlling the respective flows.

Figure 5:
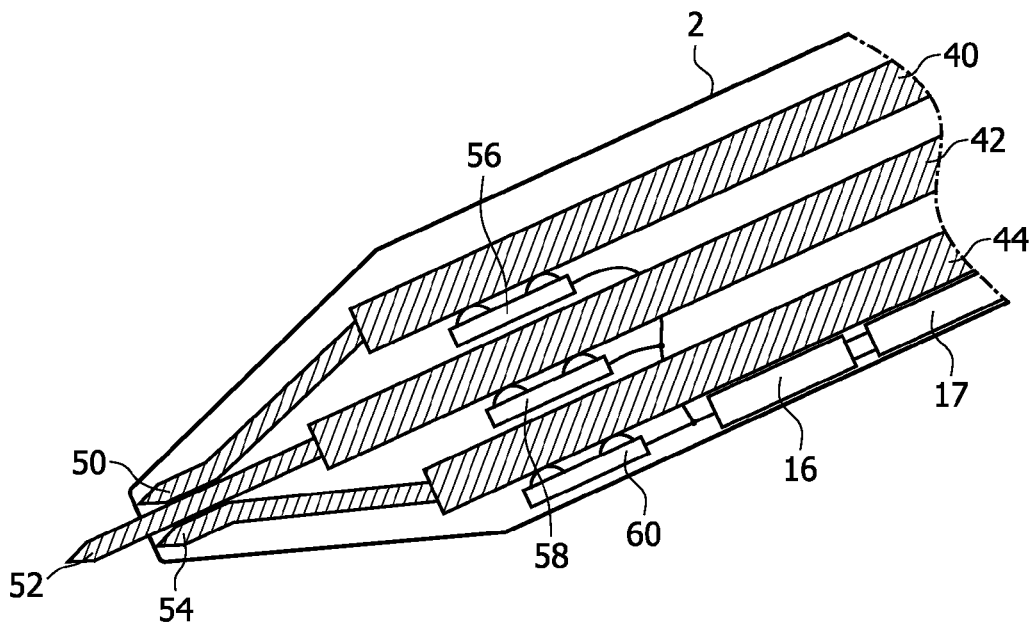
FIG. 5 schematically shows a possible ink control solution according to another embodiment.

FIG. 5 shows another embodiment, wherein tips 50, 52, 54 connected to their respective ink reservoirs 40, 42, 44 are extended or retracted to change colour, using mechanical actuators 56, 58, 60. Note that in this case, only a limited number of discrete colours can be rendered.

Figure 6:
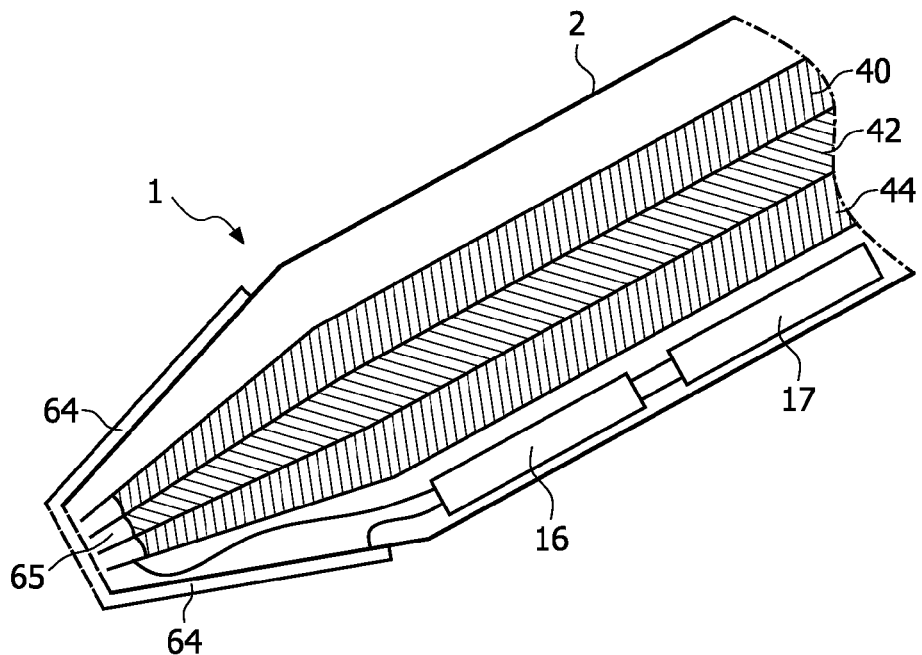
FIG. 6 schematically shows a possible ink control solution according to yet another embodiment.

In another embodiment, see FIG. 6, the actuator 14 comprises a miniaturized inkjet printer head 65, integrated in the tip of the pen 1. In contrast to known printer heads, only 3 individual nozzles would be needed to create any colour, instead of a row of nozzles for each colour, as needed for printing. In this case, the "tip" of the pen 1 is preferably covered with a touch or pressure sensor 64, to automatically start the ink spraying process when the pen 1 touches the paper, and to stop it as soon as the pen 1 is lifted. The methods for creating micro-droplet jets can be any known from inkjet printer technologies, such as thermal expansion (ink jet) or piezo pressurizing.

Figure 7:
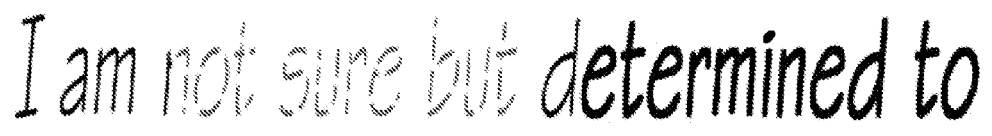

In yet another embodiment, the actuator 14 is arranged to modulate the continuity of the trace written. This can be arranged by controlling the ink-flow produced by the pen 1 in a way as described with reference to FIGS. 4 and 6. The processor 16 may be arranged to control the actuator 14, 46, 65 in such a way that certain sensory signals that represent a specific mood, will produce for example a dotted line to indicate hesitation and a continuous line to indicate self-assuredness. An example of a produced trace is shown in FIG. 7. The actuator 14 of this embodiment could comprise a miniaturized inkjet printer head. A thermal or piezo nozzle (only one required for a single color trace) can be used to draw lines by placing a sequence of micro droplets on the paper. By modulating this sequence, interrupted or dotted lines could be created.

Next to the sensors and actuators, the pen 1 comprises a processor 16, which collects the sensors inputs, analyses these to deduce the mood of the writer, and controls the actuators in the writing instrument to generate the appropriate effects. In a simple embodiment, a sensor output (for example skin conductance) could be directly linked to an actuator effect (for example colour). In a more intelligent embodiment, the different sensor inputs are compared and combined by processor 16, so a more reliable and accurate determination of mood can be made, using known relations as described in Emotional Computing literature. Processor 16 can now control the actuators such, that for example anxiety variations are mapped on a colour scale, or for example self-assuredness variations to a line-width scale. In a further refined embodiment, the colour saturation could for example be used to indicate the uncertainty level of the mood determination: more saturated colours for high certainty, more faint colours for low certainty. This will help prevent annoyance over wrong interpretations of (for example weak) sensor signals.

In a further embodiment, the pen may comprise a button or other means to switch the effects described above on or off.

Furthermore, the pen 1 could have default settings for the relation between sensor inputs and line modulation output, implemented by the manufacturer. In this case, a table describing mood parameters versus chosen modulation effect (colour, line width, line interruptions) could be provided by the manufacturer of the pen. People receiving a letter, written with the Expression Pen can then easily learn how to interpret the various effects. Alternatively, the user can simply start writing with it, and will discover over time what the various modulations correlate with in his/her personal situation.

A more advanced version of the pen 1 could have micro switches or other means (such as a computer interface), enabling the user to adjust the settings for line colour etc. In this case some preparation is needed, before starting to use the pen, but the user has greater freedom in adapting and optimising the effects for his personal situation, for example for writing diaries. The user could for example choose to select very unintuitive relations between mood and effects, so he/she is the only one who can interpret them. (In case this pen is used to write a letter to someone else however, the modified effects table should be forwarded as well, to enable the other person to interpret the effects correctly).

It is appreciated that the invention described above, can also be applied to a stylus of a pen tablet, thus enabling the same possibilities for text input for a computer. In this case the written trace (e.g. text) is not created by the ink of a pen, but as markers in a digitally stored text, which can be printed later. Here the user could have the choice to print it with, or without the mood input effects visible. For this embodiment, the writing instrument may comprise a transmitting device connected to the processor 16, wherein the transmitting device sends signals to a receiver of for example a computer having text processing facilities.

The writing instrument according to the invention, also referred to as Expressive Pen, can have a broad range of applications, some of which are:

1. Personal diaries. These are typically maintained by people to record important, intense personal experiences. With an Expressive Pen, the mood is recorded, irrespective of the exact words chosen, thus providing a much more vivid memory than currently possible.
2. Letters. Handwriting is mostly still used for personal letters. The receiver of the letter can now sense the spirit of the letter, irrespective of writer's textual abilities.
3. Signatures. Signatures are currently always the same, yet some documents will be signed with enthusiasm, others possibly with hesitation. Having a recording of this could be useful for historical reasons.

While the invention has been described in connection with preferred embodiments, it will be understood that modifications thereof within the principles outlined above will be evident to those skilled in the art. The invention is not limited to the preferred embodiments but is intended to encompass such modifications. Furthermore, the invention is not restricted to stylus shaped writing instruments, or textual input. It may well be applied to other shapes and to other methods of expression, for example artistic ones. The scope of the invention is only determined by the accompanying claims, wherein any reference signs used in the claims are not construed as limiting the scope of the invention.

The invention claimed is:

1. A writing instrument comprising:
   a writing shaft;
   a sensing device for recording at least one sensory signal related to a physiological condition of a user that is indicative of a mood of the user;
   an actuator arranged to modulate a trace of the writing instrument depending on the at least one recorded sensory signal.
2. The writing instrument of claim 1, wherein the actuator is arranged to determine the width of the trace.
3. The writing instrument of claim 1, wherein the actuator is arranged to adjust the colour of the trace.
4. The writing instrument of claim 1, wherein the actuator is arranged to adjust the continuity of the trace.
5. The writing instrument of claim 1, wherein the sensing device is embedded on the writing shaft.
6. The writing instrument of claim 1, wherein the sensing device comprises a pressure transducer embedded on the writing shaft to monitor the force exerted thereon by the user during the writing activity.
7. The writing instrument of claim 1, wherein the writing instrument comprises at least one ink reservoir.
8. The writing instrument of claim 7, wherein the writing instrument comprises a plurality of ink reservoirs each comprising a specific colour.
9. The writing instrument of claim 8, wherein the actuator is arranged to eject ink out of one outlet corresponding to a specific ink reservoir.
10. The writing instrument of claim 8, wherein the actuator comprises a plurality of micro valves.
11. The writing instrument of claim 7, wherein the actuator comprises an inkjet element for ejecting ink out of the writing instrument.
12. The writing instrument of claim 7, wherein the writing instrument comprises a flexible nozzle and wherein said actuator is arranged to deform the outlet of the nozzle.
13. The writing instrument of claim 1, wherein the sensory signal is selected from the group comprising heart rate, EEG, Surface EMG, GSR/skin conductance, respiration, blood pressure, skin temperature and finger pressure.
14. A computer device comprising:
    a stylus;
    a receiver for receiving at least one sensory signal related to a physiological condition of a user that is indicative of a mood of the user of the stylus;
    a processor arranged to modulate a trace of the stylus depending on the at least one sensory signal.
15. The writing instrument of claim 14, wherein the sensory signal is selected from the group comprising heart rate, EEG, Surface EMG, GSR/skin conductance, respiration, blood pressure, skin temperature and finger pressure.
16. Method of writing comprising:
    recording at least one sensory signal related to a physiological condition of a user that is indicative of a mood of the user by means of a writing instrument comprising a sensing device;
    modulating a trace of the writing instrument depending on the at least one recorded sensory signal.
17. The writing instrument of claim 16, wherein the sensory signal is selected from the group comprising heart rate, EEG, Surface EMG, GSR/skin conductance, respiration, blood pressure, skin temperature and finger pressure.

* * * * *